United States Patent
Bosneag et al.

(10) Patent No.: US 9,264,491 B2
(45) Date of Patent: Feb. 16, 2016

(54) DIRECT ADDRESSING OF CONTENT ON AN EDGE NETWORK NODE

(75) Inventors: Anne-Marie Cristina Bosneag, Athlone (IE); David Cleary, Athlone (IE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 843 days.

(21) Appl. No.: 13/141,676

(22) PCT Filed: Dec. 22, 2008

(86) PCT No.: PCT/EP2008/068186
§ 371 (c)(1),
(2), (4) Date: Sep. 29, 2011

(87) PCT Pub. No.: WO2010/072250
PCT Pub. Date: Jul. 1, 2010

(65) Prior Publication Data
US 2012/0113864 A1    May 10, 2012

(51) Int. Cl.
*H04W 8/04* (2009.01)
*H04L 29/08* (2006.01)
(Continued)

(52) U.S. Cl.
CPC ........ *H04L 67/104* (2013.01); *H04L 29/12028* (2013.01); *H04L 61/103* (2013.01);
(Continued)

(58) Field of Classification Search
CPC ............... H04L 12/2803; H04L 29/12028; H04L 29/12113; H04L 29/12132; H04L 29/1216; H04L 29/1232; H04L 61/103; H04L 61/1541; H04L 61/1552; H04L 61/157; H04L 61/2092; H04L 67/104; H04L 12/437; H04L 45/22; H04L 45/28; H04L 45/742; H04L 61/1523; H04L 67/1029; H04L 67/1031; H04L 67/1034; H04L 67/1002; H04L 29/12066; H04L 61/1511; H04L 69/329; H04W 8/04; G06F 9/5083; Y10S 707/99952; Y10S 707/99953; Y10S 707/99942

See application file for complete search history.

(56) References Cited

U.S. PATENT DOCUMENTS

2004/0139148 A1 *  7/2004  Norton et al. ............... 709/200
2005/0154768 A1 *  7/2005  Theimer et al. ............. 707/200
(Continued)

FOREIGN PATENT DOCUMENTS

| GB | 2446877 A | 8/2008 |
|----|-----------|--------|
| WO | 2007138044 A1 | 12/2007 |
| WO | 2008035048 A2 | 3/2008 |

OTHER PUBLICATIONS

International Search Report, Application No. PCT/EP2008/068186, dated Jan. 13, 2010, 5 pages.
(Continued)

*Primary Examiner* — Yee Lam
(74) *Attorney, Agent, or Firm* — Nicholson De Vos Webster & Elliott LLP

(57) ABSTRACT

A method of operating a home-based network device, wherein said home-based network device is part of a telecommunications network. The method comprising the steps of: assigning an address to the home-based network device, wherein said address is a function of a public identity of a subscriber associated with said home-based network device. The method further comprising registering the address of said home-based network device in an addressing space containing addressing information of other home-based network devices and providing access to said home-based network device to users that are not associated with said home-based network device.

28 Claims, 5 Drawing Sheets

(51) Int. Cl.
   *H04L 29/12*   (2006.01)
   *H04L 12/28*   (2006.01)
(52) U.S. Cl.
   CPC ............ *H04W 8/04* (2013.01); *H04L 12/2803* (2013.01); *H04L 29/1216* (2013.01); *H04L 29/1232* (2013.01); *H04L 29/12113* (2013.01); *H04L 29/12132* (2013.01); *H04L 61/157* (2013.01); *H04L 61/1541* (2013.01); *H04L 61/1552* (2013.01); *H04L 61/2092* (2013.01)

(56) References Cited

U.S. PATENT DOCUMENTS

| 2008/0225860 | A1* | 9/2008 | Manion et al. | 370/395.31 |
| 2009/0116484 | A1* | 5/2009 | Buford | 370/392 |
| 2009/0157641 | A1* | 6/2009 | Andersen et al. | 707/4 |
| 2009/0157684 | A1* | 6/2009 | Andersen et al. | 707/8 |
| 2009/0282048 | A1* | 11/2009 | Ransom et al. | 707/10 |

OTHER PUBLICATIONS

Chia-Jen Cheng et al., "A Scalable Location-Aware Peer-to-Peer System for MANET," 2005 2nd International Conference on Guangzhou, Nov. 15, 2005, 7 pages, IEEE.

Shou-Chih Lo, "Mobility Management Using P2P Techniques in Wireless Networks," Journal of Information Science and Engineering 23, Mar. 2007, pp. 421-439.

"PCT International Preliminary Report on Patentability (Chapter I) including the Written Opinion of the International Searching Authority for PCT Counterpart Application No. PCT/EP2008/068186", (Jun. 29, 2011), 11 pages.

* cited by examiner

DIRECT ADDRESSING OF CONTENT ON AN EDGE NETWORK NODE

CROSS-REFERENCE TO RELATED APPLICATIONS

This application is a National stage of International Application No. PCT/EP2008/068186, filed Dec. 22, 2008, which is hereby incorporated by reference.

TECHNICAL FIELD

This invention relates, in general, to telecommunications networks, and in particular to a method and system of accessing user content and services created by another user.

BACKGROUND

The consumer electronics market is exploding. The continued miniaturization of electronic components, enhanced processing power of chips, and reduced manufacturing costs has contributed to the proliferation of consumer electronic devices capable of processing digital media such as audio, video, images, animation, presentations, and other content. Media devices include for example, cellular phones, personal digital assistants (PDAs), MP3 players, video players, camcorders, game players, digital cameras, digital video recorders (DVRs), personal computers, stereos, etc. Many media devices are able to store large amounts of digital content, connect to the Internet, and in some instances wirelessly exchange data over short ranges with other electronic devices. The proliferation of devices capable of playing and recording digital media has resulted in large volumes of content within the household and workplace that is distributed across devices.

However, web-based storage services offered by various service providers as well as current network storage devices present a variety of drawbacks. One primary hurdle to the use of such solutions is that they limit the user to accessing stored content through a web browser or proprietary application as they were primarily designed for use with personal computers. Such solutions generally require the user to access their stored content through an intermediary server. Direct access to a personal storage device is possible by using a static Internet Protocol (IP) address or mapped domain name, but such options are generally difficult to configure, are time consuming, and result in additional fees for the user.

Addressing in telecommunication systems is broken down into three main groups: (1) Subscriber addressing: this addressing is used for keeping track of the mobility of users and making sure that a user can be contacted for any incoming call or message; (2) Network element addressing: this addressing is used for infrastructure node addressing and is mainly used by the network management; (3) Routing addressing: Network elements maintain a graph of connected nodes which allows them to keep information about their neighbouring environment, in order to be able to support call handover when subscribers move through their networks. These telecommunication addressing schemes take the position of treating the user as a subscriber identity module (SIM) and the infrastructure as two completely separate entities and do not enable addressing based on correlations between these two entities.

FIG. 1 shows how routing of a request from a subscriber 102 (or User Equipment—UE) to a content stored in a device 104 in friend's home 106 works in today's setting. The conceptual path from A's UE 102 to B's home 106 is labeled with 108. The real routing path of the request is labeled with 110. This real path will go through the access network 112, then through the packet core network 114 out on the Internet 116, where the IP address or DNS address of B's home 106 is used for reaching the edge node 104.

SUMMARY

Accordingly, it is desirable to develop a method of accessing user content and services created by another user when the content and services are stored on the other users home based device that seeks to preferably mitigate, alleviate or eliminate one or more of the disadvantages mentioned above singly or in any combination.

According to a first aspect, the present invention provides a method of operating a home-based network device which is part of a telecommunications network. The method comprises the steps of assigning an address to the home-based network device, wherein the address is a function of a public identity of a subscriber associated with the home-based network device. The method comprises registering the address of the home-based network device in an addressing space containing addressing information of other home-based network devices. Access to the home-based network device is then provided to users that are not associated with the home-based network device.

According to a second aspect, the present invention provides a home-based network device comprising an interface to a telecommunications network. The home-based network device forms part of said network and has assigned an address identifying said device, wherein the address is a function of a public identity of a subscriber associated with the home-based network device. The home-based network device is adapted to register the address in an addressing space containing addressing information of other home-based network devices and further adapted to provide access to said home-based network device to users that are not associated with said home-based network device.

According to a third aspect, the present invention provides a telecommunications network comprising a plurality of network nodes, wherein part of said network nodes are home-based network devices. An individual home-based network device comprises an interface to said telecommunications network and has assigned an address identifying said device. The address is a function of a public identity of a subscriber associated with the home-based network device. The home-based network device is adapted to register the address in an addressing space containing addressing information of the other home-based network devices, and further adapted to provide access to the individual home-based network device for users that are not associated with said home-based network device.

Further features of the present invention are as claimed in the dependent claims.

The present invention provides the benefit of a new type of user-to-user content discovery. By off-loading some discovery traffic from the core network—this type of traffic is routed through the Internet infrastructure, and does not overload the operator's network. Also, by providing a method of operating a home-based network device, wherein the home-based network device is part of a telecommunications network enables the efficient discovery of user content, being able to easily attend to software distribution/updates and a further benefit is to provide a content distribution within social communities.

The present invention provides a mechanism for addressing user generated services by using their known public identity through a distributed procedure. The addressing scheme takes into account the ownership relationship between subscribers and edge nodes (such as in the case of home-based equipment) and provides for efficient addressing of user-generated content.

The addressing scheme based on the present invention is scalable, efficient, and reconfigurable, as well as logically integrated with the existing network structure.

It is intended that the identifiers used in the addressing scheme must be logically related to some unique subscriber information currently defined and used in the network.

BRIEF DESCRIPTION OF THE DRAWINGS

The present invention will be understood and appreciated more fully from the following detailed description taken in conjunction with the drawings in which.

DETAILED DESCRIPTION

Figure 1:
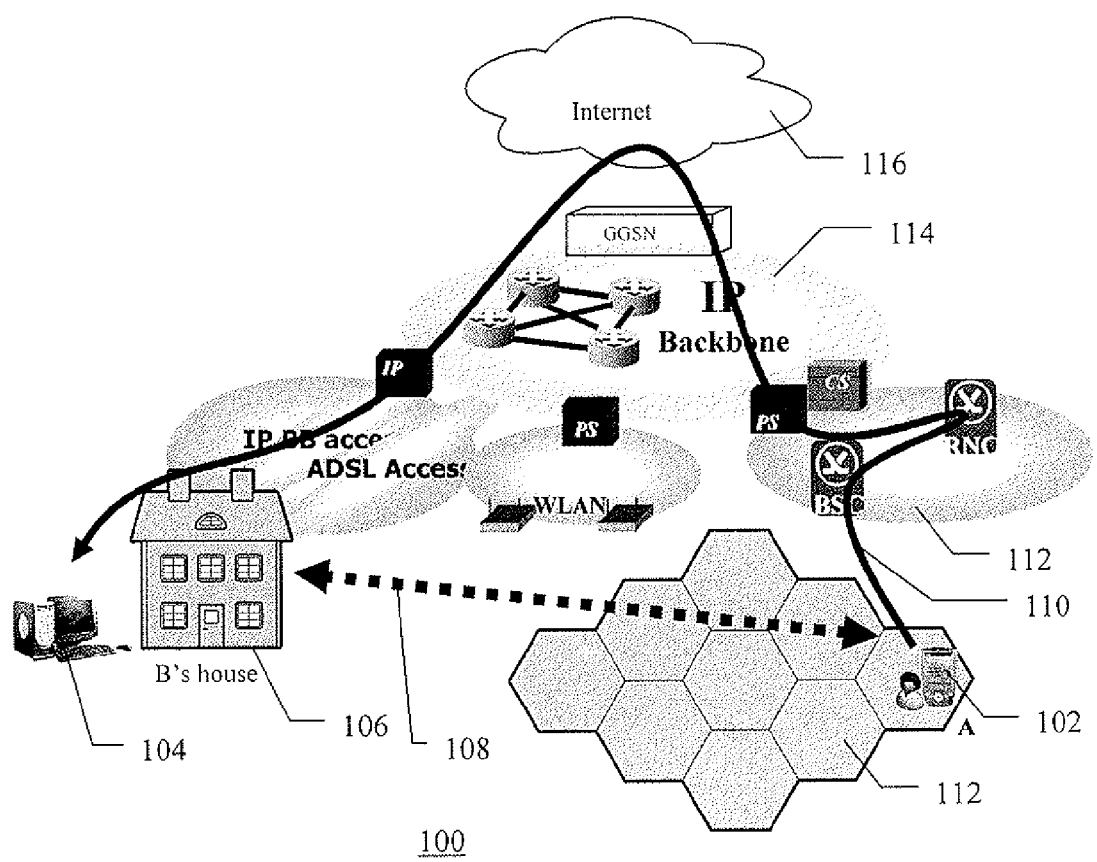
FIG. 1 shows a schematic of a routing path from a UE to a users home-based network device according to the prior art.

The present invention will be discussed hereinafter in detail in terms of the preferred embodiment of an apparatus and method allowing to access content on an edge node of the network. In the following description, numerous specific details are set forth in order to provide a thorough understanding of the present invention. It will be obvious, however, to those skilled in the art that the present invention may be practiced without these specific details.

As home-based network equipment gains popularity, there will be a need for an addressing scheme which is not based on IP addresses but still supports direct discovery from one home-based network device to another. This also means that there is currently a need for a classic centralized addressing scheme which does not require any changes in the network that must first be reflected in the central inventory/capability database.

There is also currently a need for a unified scheme for heterogeneous access—users might use different types of access to discover the services and content provided on the home-based devices of another user. For example, one user might access these services through the Internet from their home laptop, while another one would access them through their mobile phone, connected through the mobile network, or even through the Session Initiation Protocol (SIP) addressing space if it is connected through an IP Multimedia Subsystem (IMS) enabled device.

Finally, there is a need for a centralized solution which is capable of handling a very large volume of data, proportional with the number of user-generated services to be discovered.

Users of a telecommunications network can offer services and take advantage of the services offered by other users, wherein the services are offered from home. Home-based network equipment that makes possible offering the services are home gateways and home base stations. In the embodiments of the invention the home-based network equipment is part of the telecommunications network and the equipment is managed by said network.

The Network Management System knows about all equipment connected to said network and the Home Location Register and/or Home Subscriber Server know the location of the subscriber. But there is no relationship between a user's identity and his/her home network (i.e. equipment connected to the telecommunications network such as a gateway or femto Home Base Station). Today's mobile services are all resident in the service network controlled by the operator or a business partner of the network owner. The addressing scheme of the present invention creates a composite addressing model, that takes into account both the subscribers' identity and their relationship to the home equipment, and is keyed by a global unique identity.

The problem with accessing this type of services that is present today, as discussed earlier, is addressing. The present invention proposes a new addressing scheme in which user A can find the edge network node (home-based network device) owned by user B and check the services offered by the device owned by B.

Figure 2:
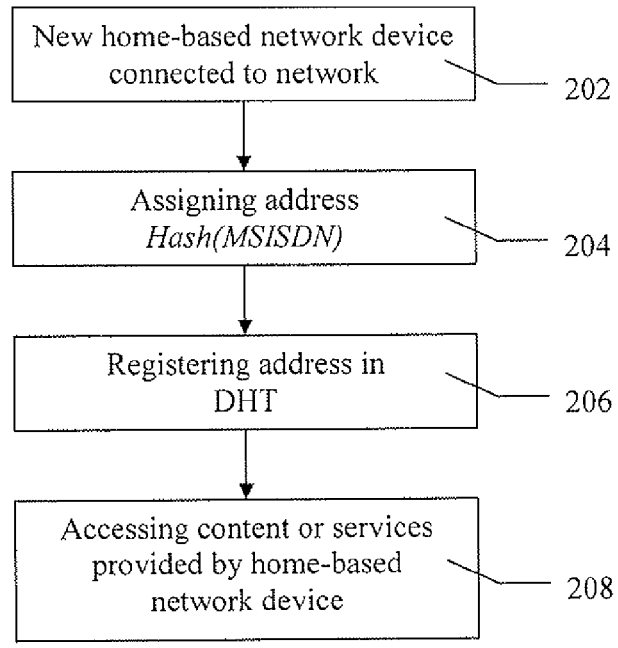
FIG. 2 shows a flowchart of the method steps in accordance with an embodiment of the present invention.
Figure 6:
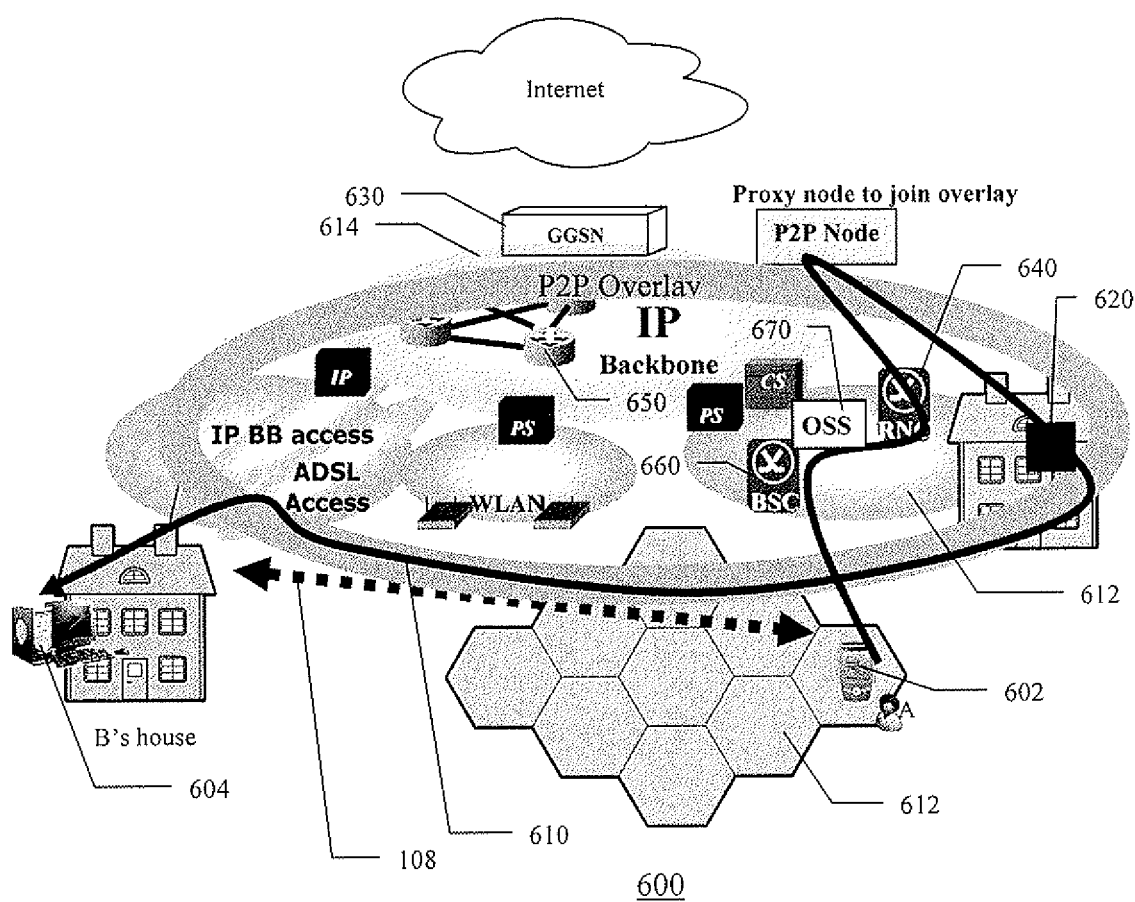
FIG. 6 shows a schematic of a routing path when the UE is connected to a cellular network in accordance with an embodiment of the present invention.
Figure 7:
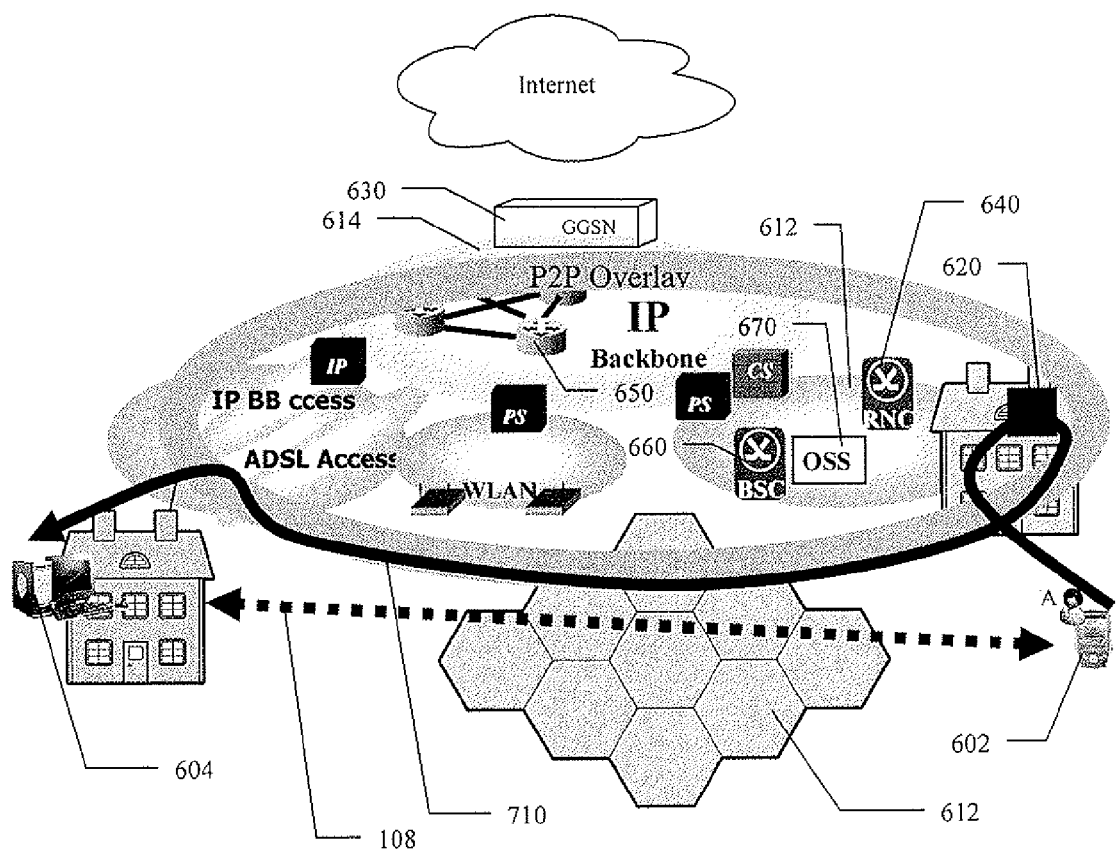
FIG. 7 shows a schematic of a routing path when the UE is connected to the home-based network in accordance with an embodiment of the present invention.

FIG. 2 is a flow chart illustrating a method of operating a home-based network device in one embodiment of the present invention. As mentioned earlier the home-based network device is part of the telecommunications network. When a user signs for services provided by a telecommunications network he receives or buys a device that works as home gateway or home base station and connects 202 this device to the network. When connected to the network (as shown in FIG. 6 and FIG. 7) this device 604 becomes a home-based network device and is part of the network 600. The operator of the network 600 assigns a public ID to the subscriber when the subscriber enters the contract. This public ID may be MSISDN (Mobile Subscriber Integrated Services Digital Network Number) in the case of USIM (Universal Subscriber Identity Module) subscriber in UMTS network, which is simply a telephone number of this subscriber. In an alternative embodiment IMPU (Internet Protocol Multimedia Public Identity) is used in the case of a ISIM (Internet Protocol Multimedia Services Identity Module) subscriber.

The method comprises a step of assigning 204 an address to the home-based network device 604. The address is a function of said public identity of the subscriber associated with the home-based network device 604. In a preferred embodiment hashing function is used to produce the address based on the public ID as shown below:

NodeID=hash (MSISDN) in the case of USIM subscriber

Or

NodeId=hash (IMPU) in the case of a ISIM subscriber where hash is a hashing function such as, for example, SHA-1. This will ensure that the addresses are uniformly spread across the addressing space and guarantees discovery in an average of O(log N) steps, where N is the number of devices in the addressing space. The model used in embodiments of the present invention is based on distributed addressing through a Distributed Hash Table (DHT), which also features load balancing, as well as automatic re-configuration of the space when new nodes are added or others are taken down or fail. Correlation between the user's public identity and the address is an important contribution of this invention, as it creates the link between the subscriber's addressing space and the device addressing space.

In the next step 206 the address of the home-based network device is registered in an addressing space that contains addressing information of other home-based network devices. In a preferred embodiment the process of registering the home-based network device is performed during powering up and comprises sending a join message and collecting information from at least part of home-based network devices in the addressing space. The join message is sent through the DHT to the ID of the new node. For instance, if node with ID=1AF3 wants to join, it will send a message join (1AF3). Normal routing will take place and the built-in DHT functionality routes this message to the point in the overlay where the new node needs to join. This is how the new node finds which neighbours it will have in the overlay. Based on the collected information routing tables are initiated by the home-based network device.

Once the device 604 is registered in the addressing space it can be easily found by other users and the method in its final step provides access 208 to the home-based network device to users that are not associated with the home-based network device. In this way the user A can access the content or services provided by the home-based network device 604 of user B by knowing the phone number of the user B. The addressing scheme and method of accessing services and content can be used to enhance experiences in social groups. Additional authorisation schemes can be used for controlling access to the services, content and devices if needed.

The present invention in one of its embodiments also provides an effective solution for situation where there is more than one user that has an ownership relation to the home-based device. All services called are provided on the home-based device and not on the individual mobile devices of the different users associated with the home gateway. Having multiple identities associated with one device makes it easy, for example, to get to the device using either father's phone number (for father's friends) or son's phone number (for son's friends). To solve this problem preferably the method comprises registration of at least one additional public identity of a subscriber with the home-based network device and this information is recorded in the addressing space. This registration will place onto the DHT ring the association between the additional public identity and the edge device's ID. Therefore, the registration procedure will hash the new public identity, and send a message of type register(public_identity, myID) on the DHT ring, where the public_identity is either the MSISDN or the IMPU of the additional subscriber and myID is the ID of the home-based device as is in the addressing space, i.e. hash(IMPU_1). This will be stored on the node whose ID is closest to the hash of the new public identity. Encryption methods or other security techniques will apply here, but are outside the scope of this invention.

In practice it means that there will be two or more addresses associated with the same device, but created from two or more public IDs, e.g. hash(IMPU_1) and hash(IMPU_2). In effect there will be more than one addresses pointing to the same home-based device.

Once the home-based network device (also referred to as an edge node) is registered in the addressing space it (services and content available on this device) may be accessed by other users. The process of accessing includes calculating the address of the home-based network device as the function of the public identity (phone number) of the subscriber associated with the home-based network device. Once a request to access the device is sent and received by the other user's home-based network device a discovery procedure is initiated in the addressing space of the home-based network devices.

In a telecommunications network the edge node's state is enhanced by an overlay routing state (normal routing tables, leafset and neighbourhood set in DHT-based systems) and by indirection links from public identities to the edge equipment. Where a leafset contains neighbours in the overlay ring, half of them with ids larger than the ID of the current node and half smaller, and the neighbourhood set contains known neighbours in the underlying physical network, i.e. network nodes that are close to the current network node based on a metric defined in the physical layer (e.g., geographical distance, latency of links, or combinations thereof). This set of network nodes is used when populating routing tables and leafsets, to ensure that if multiple choices exist, the network node closest to the current network node with respect to the pre-defined metric is chosen. It is also used to route around potential partitions in the overlay (i.e., in the case of a failure failures the creation of partitions in the overlay information about neighbours in the physical network is used to reach other partitions). Based on this state, the edge node can find a target destination by using normal DHT routing and one indirection if needed.

Figure 3:
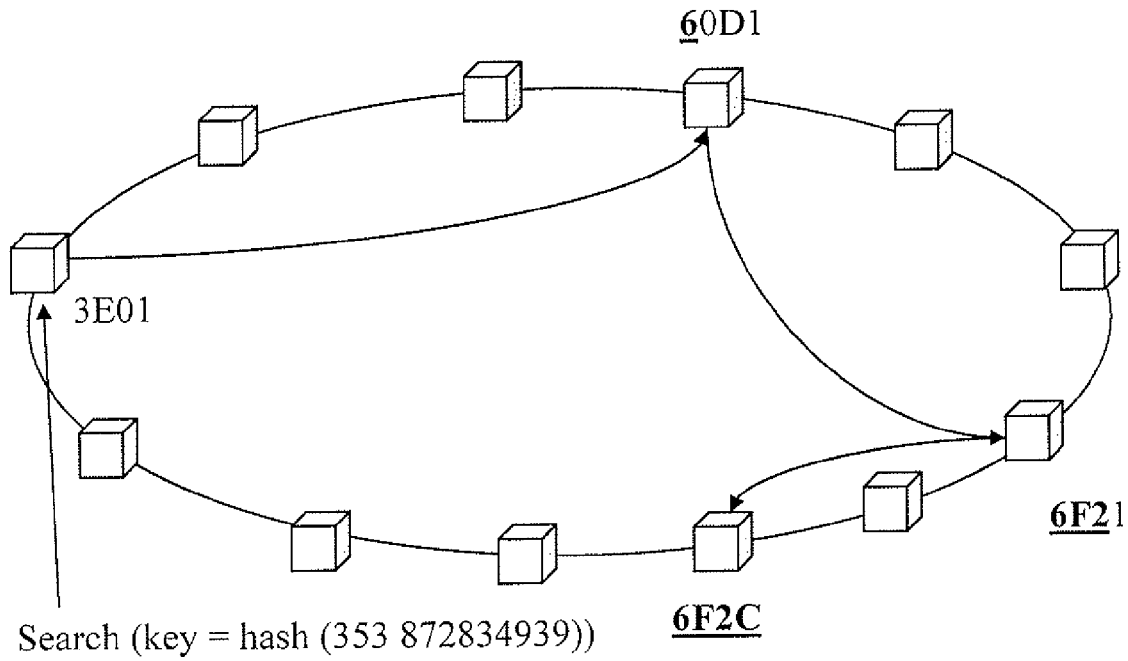
FIG. 3 shows a DHT-based lookup for matching prefixes of the nodes along a route in accordance with an embodiment of the present invention.
Figure 4:
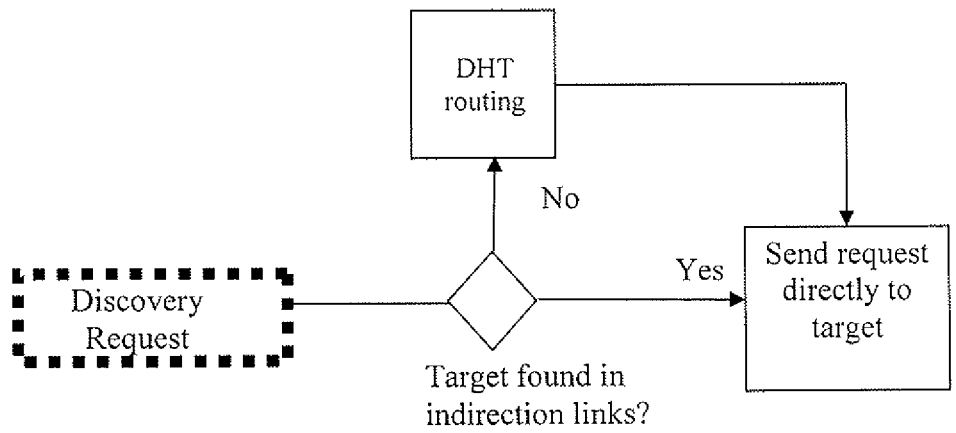
FIG. 4 shows a flowchart for the resolution of a target address based on the distributed discovery in a home-based network device in accordance with an embodiment of the present invention.

DHT-like discovery can be used for reaching the edge node by having a client application residing in the UE (user equipment), which can translate the friend's public identity (either MSISDN or IMPU) into a nodeID (by hashing the public identity with a hashing function known to the client application) and launch a DHT discovery on the new addressing space. The DHT discovery is distributed and works by matching increasingly longer prefixes of the nodes along the route to the given target ID, as shown in FIG. 3. It may include one additional indirection step, depending on whether the search is made using the device owner's identity or one of the additional identities, as shown in the diagram included in FIG. 4.

Figure 5:
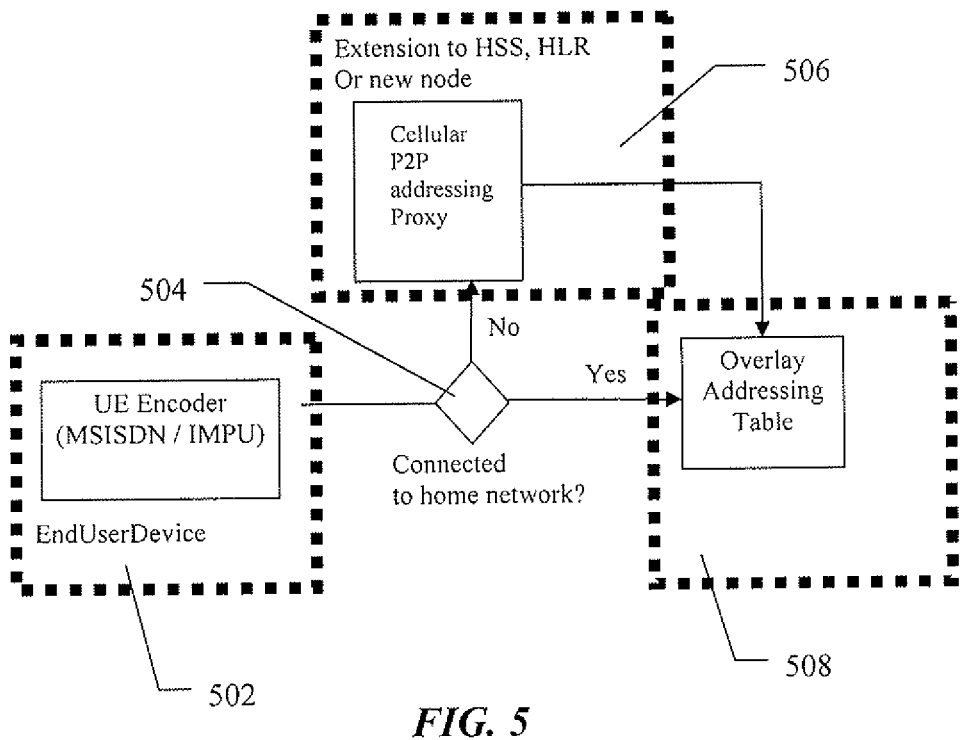
FIG. 5 shows a flowchart for the resolution of a target address based on distributed discovery in a home-based network device in accordance with an embodiment of the present invention.

The present invention in its various embodiments shown in FIG. 6 and FIG. 7 allows for accessing an edge node 604 (i.e. home-based network device) by using a phone number of a subscriber associated with the device via a cellular network 612 or via another edge node 620. The selection of an appropriate way of accessing the edge node is illustrated in FIG. 5. When a user requests to access the content a request is created based on the target phone number and via hashing function the phone number is encoded 502 to a format that is easier to search. Then it is checked 504 if the user equipment 602 is connected to its home network (i.e. to the home-based network device associated with the UE 602). If the connection is via a cellular network a Home Location Register (HLR) or a Home Subscriber Server (HSS) is used for path resolution, 506 and then, 508, the DHT stored in the user's home-based network device 620 for routing the request to the target device 604.

If a user equipment 602 is connected to a cellular network 612, 614 the user of this UE 602 can access the home-based network device 604 comprises calling a function which is an extension to the HLR or HSS. Said function stores the ownership relationship between user identities and their home-based network device to correctly re-direct the access request.

FIG. 6 shows the resulting routing path 610 in the case when the UE 602 is connected to the cellular network 612, 64. The request will be resolved in the HLR or HSS extension for the new addressing scheme, directed to the home-based network device associated with the user A (and his UE 602) which is located in B's home and then routed directly to B's home 604.

In an alternative embodiment the user A is accessing the edge node 604 associated with user B when user A is at home and can connect to the network via his edge node 620. The selection of an appropriate way of accessing the edge node is illustrated in FIG. 5. When a user requests to access the content a request is created based on the target phone number and via hashing function the phone number is encoded 502 to a format that is easier to search. Then it is checked 504 if the user equipment 602 is connected to its home network (i.e. to the home-based network device associated with the UE 602). When UE 602 initiates discovery of services offered by another user 604 by using the other user's public identity (MSISDN/IMPU) and the UE 602 is connected to its home network 508, the discovery process will be handled by the edge network device 620 following the distributed process described in relation to FIG. 3. The process comprises searching for the address of the home-based network device 604 in a routing table stored in the home-based network device 620 associated with user A, wherein the routing table comprises at least part of the addressing space. The route from UE 602 to the home-based network device 604 is illustrated in FIG. 7. FIG. 7 shows the resulting routing path when UE of the user A discovers the home of the user B through the new addressing space formed by home-based network devices. UE 602 must find an entry point into the new addressing space, which will normally be its own home-based node 620 that it knows how to connect to. The request is then routed from A's home node 620 (which has an IP address) towards B's home node 604. The route is shown in FIG. 7 as 710.

Each node stores part of the DHT space. If target ID is not stored in the routing table of the local device, then the local node finds in its local tables the next hop along the route to the target ID (next node will be one step closer to the target). FIG. 3 shows an example, where node 3F01 receives a request for target 6F2C, and finds the next node which matches the first digit of target—this is 60D1, then the second digit is matched in 6F21 until the target is reached.

It may be that the address of the target ID is found in an indirection table. The indirection table is used to store the associations between additional IDs and the home-based network device (e.g. home gateway or home base station). It is stored in the DHT, on the node whose ID most closely matches the hash of the ID of the user, i.e. hash (user_phone_number)=ID of node in DHT.

When more than one ID is associated with one home-based network device 604 (e.g. a father's phone number and a son's phone number) the device and method in accordance with embodiments of the present invention allows for a very quick access to the content or services of one of them by the other one. If the son wants to access content provided by his father and he does it from home he uses his father phone number. Then the home-based network device immediately recognises that it is its own address and sends the request directly to the content (e.g. a file server) and this request does not leave the home network.

If the target ID in the request is not found in the indirection table, then a classic DHT-based discovery is performed, which means that either the request is forwarded to the next node along the route to the target node, or the response ID sent back if the current node discovers that it is the target node itself.

In one embodiment the invention also defines a home-based network device 604 comprising an interface to a telecommunications network 600. Said home-based network device 604 forms part of said network 600. The device 604 is identified in the network by an assigned address, wherein the address is a function of a public identity of a subscriber associated with the home-based network device 604. As discussed earlier, with relation to the method in accordance with embodiments of the present invention, the home-based network device 604 when connected to the network 600 registers the address in an addressing space containing addressing information of other home-based network devices. Once the device 604 is registered in the addressing space it can be accessed by users that are not associated with said home-based network device. In this way the user associated with this home-based network device 604 can store and give access to content or services to other users (e.g. friends, family and other users). In order to prevent accessing the device 604 by unwanted users some known methods of authorisation and authentication can be used.

In a preferred embodiment the registration of the device 604 is performed during powering up. In this operation the device 604 sends a join message and collects information from at least part of home-based network devices in the addressing space. With this collected information the device 604 initiates its routing tables.

In a normal use, e.g. in a family home, there may be more than one user that would like use the device 604 to give access to his/her content or services to other users. In order to separate these users and their content, which is especially important in the case of implemented authorisation/authentication mechanisms, the device 604 allows for registration of additional public identities. In this way more than one member of the family can register his/her public ID (mobile phone number) with said home-based network device 604, wherein this information is recorded in the addressing space.

The device 604 comprises a memory for storing an overlay routing state and indirection links from public entities to home-based network devices and preferably the overlay routing state comprises routing tables, leafset and neighbourhood set in Distributed Hash Table based systems.

FIGS. 6 and 7 illustrate a telecommunications network 600 in one embodiment of the present invention. The network 600 comprises a plurality of network nodes 604, 620-660, wherein part of said network nodes are home-based network devices 604 and 620. An individual home-based network device 604 comprises an interface to said telecommunications network 600 and has assigned an address identifying said device 604. The address is a function, preferably a hashing function, of a public identity of a subscriber associated with the home-based network device 604. The device 604 registers the address in an addressing space as it was described earlier. The network 600 provides access to the individual home-based network device 604 to users that are not associated with said home-based network device 604.

In one embodiment the network comprises a network management system 670, which manages the home-based network devices 604, 620 and also other elements of the network 600. The network 600 further comprises a database containing details of subscribers authorized to use the network, e.g. HLR, wherein said database determines location of user equipment connected to the network.

The present invention can be easily implemented in telecommunications network and in addition to the benefit of providing a scalable and easy to use and implement addressing scheme the invention also, in its various embodiments, allows for off-loading some discovery traffic from the core network—this type of traffic is routed through the Internet infrastructure, and does not overload the operator's network.

The invention claimed is:

1. A method of accessing content or services provided in a home-based network that includes a home-based network device belonging to a first subscriber, wherein the home-based network device is an edge node of a telecommunications network, the method comprising the steps of:
- assigning an address to the home-based network device, wherein the address is produced as a function of a public identity of the first subscriber associated with the home-based network device;
- registering the address of the home-based network device in an addressing space containing addressing information of other home-based network devices; and
- providing access to the home-based network device of the first subscriber to a second subscriber that is not associated with the home-based network device via another home based network device, wherein the another home based network device is another edge node of the telecommunications network and is associated with the second subscriber, such that the second subscriber finds the home-based network device including through a calculation of the address of the home-based network device using the function of the public identity of the first subscriber associated with the home-based network device and the initiation of a discovery procedure in the addressing space, wherein the discovery procedure includes receiving a request from the second subscriber that causes a search for the address of the home-based network device in a routing table stored in the another home-based network device, wherein the routing table comprises at least part of the addressing space and wherein if the address of the home-based network device being accessed is not stored in the routing table of the another home-based network device, then a next hop is found in the routing table along a route to the home-based network device being accessed by matching one digit at a time of the address of the home-based network device with an address of the next hop in the addressing space until the home-based network device is reached.

2. The method according to claim 1, wherein the step of registering the address of the home-based network device is performed during powering up and comprises sending a join message and collecting information from at least one of the other home-based network devices in the addressing space and initiating routing tables by the home-based network device based on the collected information.

3. The method according to claim 1, further comprising registration of at least one additional public identity of an additional subscriber associated with the home-based network device, wherein the at least one additional public identity of an additional subscriber is recorded in the addressing space.

4. The method according to claim 1, wherein the step of accessing the home-based network device comprises receiving a request from a user connected to a cellular network that causes:
- an extension to a Home Location Register or a Home Subscriber Server to be called, and
- storing an ownership relationship between user identities and their home-based network devices to correctly redirect that user's request.

5. The method according to claim 1, wherein the step of assigning the address to the home-based network device includes hashing the public identity of the first subscriber to produce the address of the home-based network device.

6. The method according to claim 1, wherein the addressing space comprises a distributed hash table.

7. The method according to claim 1, wherein the access to the home-based network device comprises access to content or services provided through the home-based network device.

8. The method according to claim 7, wherein if one subscriber associated with the home-based network device is requesting access to a service or content provided by at least one additional subscriber associated with the home-based network device, the method further comprises sending that request directly to the home-based network device owned by the at least one additional subscriber.

9. The method according to claim 1, further comprising storing in the home-based network device an overlay routing state and indirection links from other public entities to their home-based network devices.

10. The method according to claim 9, wherein said overlay routing state comprises routing tables, a leafset and a neighbourhood set in Distributed Hash Table based systems.

11. A home-based network device comprising:
- an interface to a network, wherein said home-based network device is an edge node of said network; and
- wherein the home-based network device is assigned an address that identifies said home-based network device, wherein the address is produced as a function of a public identity of a first subscriber associated with the home-based network device, and
- wherein the home-based network device is adapted to register the address in an addressing space containing addressing information of other home-based network devices; and
- wherein the home-based network device is further adapted to provide access to said home-based network device to a second subscriber that is not associated with said home-based network device, such that the second subscriber finds the home-based network device including through a calculation of the address of the home-based network device using the function of the public identity of the first subscriber associated with the home-based network device and the initiation of a discovery procedure in the addressing space, wherein the discovery procedure includes the receipt of a request from the second subscriber that causes a search for the address of the home-based network device in a routing table stored in another home-based network device associated with the second subscriber, wherein the routing table comprises at least part of the addressing space and wherein if the address of the home-based network device is not stored in the routing table of the another home-based network device, then a next hop is found in the routing table along a route to the home-based network device by matching one digit at a time of the address of the home-based network device with an address of the next hop in the addressing space until the home-based network device is reached.

12. The device according to claim 11, wherein the device is further adapted to register the address during powering up, and to send a join message and collect information from at least one of the other home-based network devices in the addressing space and to initiate routing tables in said home-based network device based on the collected information.

13. The device according to claim 11, further adapted to register at least one additional public identity of an additional subscriber with said home-based network device, wherein the at least one additional public identity of an additional subscriber is recorded in the addressing space.

14. The device according to claim 11, wherein the function is a hashing function that transforms the public identity of the first subscriber into the address of the home-based network device.

15. The device according to claim 11, wherein the addressing space comprises a distributed hash table.

16. The device according to claim 11, further comprising a memory is adapted to store an overlay routing state and indirection links from other public entities to their home-based network devices.

17. The device according to claim 16, wherein said overlay routing state comprises routing tables, a leafset and a neighbourhood set in distributed hash table based systems.

18. A telecommunications network comprising:
a plurality of network nodes, wherein part of said plurality of network nodes are edge nodes operating as home-based network devices; and
an individual home-based network device comprising:
an interface to said telecommunications network; and
wherein the individual home-based network device is assigned an address that identifies said individual home-based network device,
wherein the address is produced as a function of a public identity of a first subscriber associated with the individual home-based network device; and
the individual home-based network device is adapted to register the address in an addressing space containing addressing information of other home-based network devices;
wherein the telecommunications network is further adapted to provide access to the individual home-based network device for a second subscriber that is not associated with said individual home-based network device such that the second subscriber finds the individual home-based network device including through a calculation of the address of the individual home-based network device using the function of the public identity of the first subscriber associated with the individual home-based network device and the initiation of a discovery procedure in the addressing space, wherein the discovery procedure includes the receipt of a request from the second subscriber that causes a search for the address of the home-based network device in a routing table stored in another home-based network device associated with the second subscriber, wherein the routing table comprises at least part of the addressing space and wherein if the address of the individual home-based network device being accessed is not stored in the routing table of the another home-based network device, then a next hop is found in the routing table along a route to the individual home-based network device being accessed by matching one digit at a time of the address of the home-based network device with an address of the next hop in the addressing space until the home-based network device is reached.

19. The network according to claim 18, further comprising a network management system adapted to manage the home-based network devices, and further comprises a database containing details of subscribers authorized to use the network, wherein said database is adapted to determine a location of a user equipment connected to the network.

20. The network according to claim 18, wherein the individual home-based network device is adapted to register the address during powering up and to send a join message and collecting information from at least one of the other home-based network devices in the addressing space and initiating routing tables by the individual home-based network device based on the collected information.

21. The network according to claim 18, wherein the individual home-based network device is further adapted to register at least one additional public identity of an additional subscriber associated with the individual home-based network device, wherein the at least one additional public identity of an additional subscriber is recorded in the addressing space.

22. The network according to claim 18, wherein the individual home-based network device is further adapted to receive a request from a user connected to a cellular network that causes:
an extension to a Home Location Register or a Home Subscriber Server to be called, and
storing an ownership relationship between user identities and their home-based network device to correctly redirect that user's request.

23. The network according to claim 18, wherein the function is a hashing function that transforms the public identity of the first subscriber into the address of the home-based network device.

24. The network according to claim 18, wherein the addressing space comprises a distributed hash table.

25. The network according to claim 18, wherein the access to the individual home-based network device comprises access to content or services provided through the individual home-based network device.

26. The network according to claim 25, wherein if one subscriber associated with the individual home-based network device is requesting access to a service or content provided by at least one additional subscriber associated with the individual home-based network device, the request is sent directly to the home-based network device owned by the at least one additional subscriber.

27. The network according to claim 18, wherein the individual home-based network device further comprises memory adapted to store an overlay routing state and indirection links from other public entities to their home-based network devices.

28. The network according to claim 27, wherein said overlay routing state comprises routing tables, a leafset and a neighbourhood set in Distributed Hash Table based systems.

* * * * *